US012623893B2

(12) United States Patent
Harris

(10) Patent No.: US 12,623,893 B2
(45) Date of Patent: May 12, 2026

(54) VEHICLE SELF-LEVELING FOR OVERLANDING VEHICLES

(71) Applicant: TOYOTA MOTOR ENGINEERING & MANUFACTURING NORTH AMERICA, INC., Plano, TX (US)

(72) Inventor: Ryan C. Harris, Saline, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

(*) Notice: Subject to any disclaimer, the term of this patent is extended or adjusted under 35 U.S.C. 154(b) by 128 days.

(21) Appl. No.: 18/299,564

(22) Filed: Apr. 12, 2023

(65) Prior Publication Data

US 2024/0343535 A1 Oct. 17, 2024

(51) Int. Cl.
*B66F 3/46* (2006.01)
*B66F 3/35* (2006.01)

(52) U.S. Cl.
CPC . *B66F 3/46* (2013.01); *B66F 3/35* (2013.01)

(58) Field of Classification Search
CPC ..................................... B66F 3/46; B66F 3/35
See application file for complete search history.

(56) References Cited

U.S. PATENT DOCUMENTS 2,848,248 A * 8/1958 Hansen .................. B60G 21/10 267/64.19
3,912,288 A * 10/1975 F'Geppert ............... F41A 23/56 254/423
4,746,133 A 5/1988 Hanser
4,784,400 A * 11/1988 Hofius ...................... B60S 9/10 254/93 VA
4,938,305 A * 7/1990 Park ........................ B60S 9/215 180/199
5,224,688 A * 7/1993 Torres ....................... B60S 9/12 254/423
5,938,179 A * 8/1999 Beukers .................... B66F 3/35 254/93 HP
6,082,743 A * 7/2000 Black ........................ B66F 3/35 254/93 HP
6,404,073 B1 * 6/2002 Chiang ................. B60R 25/001 254/423

(Continued)

FOREIGN PATENT DOCUMENTS

CN 208567893 U 3/2019
EP 3026416 A1 * 6/2016 ............. B66F 7/065

(Continued)

OTHER PUBLICATIONS

Smartphone car key—TechCrunch (Year: 2021).*

*Primary Examiner* — Timothy Wilhelm
(74) *Attorney, Agent, or Firm* — SHEPPARD, MULLIN, RICHTER & HAMPTON LLP; Daniel N. Yannuzzi

(57) ABSTRACT

Systems and methods of leveling a vehicle are disclosed. Exemplary implementations may: provide a plurality of air bag jacks under the vehicle; determine roll and pitch information of the vehicle; determine, using a computing system, an amount of air-adjustment to make for one or more of the plurality of air bag jacks, based on the roll and pitch information, to level the vehicle; and activate, via the computing system, an air compressor to make the determined air-adjustment.

20 Claims, 6 Drawing Sheets

(56) References Cited

U.S. PATENT DOCUMENTS

| | | | | |
|---|---|---|---|---|
| 6,584,385 | B1 * | 6/2003 | Ford | B60G 17/0161<br>180/41 |
| 6,895,648 | B1 * | 5/2005 | Willett | B66F 3/247<br>254/93 VA |
| 6,929,249 | B1 * | 8/2005 | Kim | B66F 3/35<br>254/93 H |
| 7,199,534 | B2 * | 4/2007 | Ford | B66F 3/46<br>318/432 |
| 7,415,770 | B2 | 8/2008 | Naruse | |
| 7,637,480 | B2 * | 12/2009 | Weinel | B66F 3/35<br>254/93 H |
| 7,845,577 | B2 * | 12/2010 | Hermann | F15B 15/10<br>238/14 |
| 9,580,284 | B2 * | 2/2017 | Helmich | B66F 3/46 |
| 9,889,824 | B2 * | 2/2018 | Jackson, Sr. | B66F 3/247 |
| 9,950,916 | B2 * | 4/2018 | Jaipaul | B66F 7/04 |
| 11,105,623 | B2 * | 8/2021 | Manfreda | B66F 3/46 |
| 2004/0178587 | A1 * | 9/2004 | Hiebert | B60G 17/0523<br>280/5.507 |
| 2004/0217338 | A1 * | 11/2004 | Abrahamson | F15B 15/10<br>254/93 H |
| 2005/0098931 | A1 * | 5/2005 | Schisler | F16F 9/05<br>267/64.27 |
| 2007/0138818 | A1 * | 6/2007 | Chong | B66F 3/35<br>296/1.01 |
| 2008/0001130 | A1 * | 1/2008 | Dibdin | B66F 7/085<br>414/495 |
| 2014/0214283 | A1 * | 7/2014 | Maurer | B60S 9/02<br>700/275 |
| 2017/0203942 | A1 * | 7/2017 | Gonzaga | B60B 30/02 |
| 2019/0389265 | A1 * | 12/2019 | Bartlett | B66F 9/07577 |
| 2020/0094645 | A1 * | 3/2020 | Edren | B60W 10/22 |
| 2020/0238782 | A1 * | 7/2020 | Vaughan | F15B 1/08 |
| 2021/0039469 | A1 | 2/2021 | Vaughan | |
| 2021/0339593 | A1 * | 11/2021 | Saylor | B60G 17/0155 |
| 2022/0380004 | A1 * | 12/2022 | Walker | B60G 17/08 |
| 2023/0373262 | A1 * | 11/2023 | M?lle | B60G 17/0155 |
| 2023/0382174 | A1 * | 11/2023 | Coleman | B62D 53/067 |
| 2024/0181832 | A1 * | 6/2024 | Baik | F04C 18/0215 |
| 2024/0343535 | A1 * | 10/2024 | Harris | B66F 3/35 |

FOREIGN PATENT DOCUMENTS

| | | | |
|---|---|---|---|
| KR | 102277826 | B1 * | 7/2021 |
| WO | WO-2016195612 | A1 * | 12/2016 |
| WO | 2018034646 | A1 | 2/2018 |
| WO | 2021061848 | A1 | 4/2021 |

* cited by examiner

VEHICLE SELF-LEVELING FOR OVERLANDING VEHICLES

TECHNICAL FIELD

The present disclosure relates generally to leveling of a vehicle, and in particular, some implementations may relate to self-leveling of a vehicle using air bag jacks.

DESCRIPTION OF RELATED ART

In certain situations, it may become necessary or desirable to ensure a vehicle is properly level. For example, when an occupant uses a vehicle to camp in or sleep in/on (or otherwise spend time in/on), keeping the vehicle as level as possible would be ideal. A vehicle that is not level would make for an uncomfortable environment for the occupant, especially when the occupant attempts to camp or sleep within the vehicle. However, leveling a vehicle can be quite difficult and time-consuming. It is common to use leveling blocks or even logs or rocks placed under various portions of a vehicle in an effort to make a vehicle level. But these items may be in short supply, and often are cumbersome and heavy to reliably orient and stack under a vehicle in a stable and efficient manner. Moreover, there is no indication that serves to confirm the status of the leveling process, or that the vehicle has actually been made level. Better methods are needed to level a vehicle overall.

BRIEF SUMMARY OF THE DISCLOSURE

According to various embodiments of the disclosed technology, a method of leveling a vehicle, comprises: providing a plurality of air bag jacks under the vehicle; determining roll and pitch information of the vehicle; determining, using a computing system, an amount of air-adjustment to make for one or more of the plurality of air bag jacks, based on the roll and pitch information, to level the vehicle; and activating, via the computing system, an air compressor to make the determined air-adjustment.

In some embodiments, the method further comprises determining a selected air bag jack of the plurality of air bag jacks to adjust and opening a pneumatic solenoid valve corresponding to the selected air bag jack to permit air-adjustment. In one embodiment, the method yet further comprises closing the opened pneumatic solenoid valve after air-adjustment is made to the selected air bag jack.

In some embodiments, the determination of the roll and pitch information of the vehicle is made using a roll/pitch sensor.

In some embodiments, the method further comprises determining roll and pitch information of the vehicle subsequent to making the determined air-adjustment to identify a level condition of the vehicle. In one embodiment, the identified level condition of the vehicle serves to confirm that the vehicle is level. In another embodiment, the identified level condition of the vehicle serves to identify that a non-level condition of the vehicle exists indicating that a further air-adjustment needs to be made to level the vehicle. Upon the identification that a non-level condition of the vehicle exists, the method may further comprise repeating, using the steps of determining using the computing system, activating, and determining roll and pitch information of the vehicle subsequent to making the determined air adjustment, until the vehicle is level.

In some embodiments, the method further comprises pressing a start mechanism to initiate the method steps. The start mechanism may be provided via a physical controller within the vehicle, or via a representation of a text command or controller on a graphical user interface of a multimedia display within the vehicle.

According to additional embodiments of the disclosed technology, a vehicle control system for leveling a vehicle, comprises: a processor; and a memory coupled to the processor to store instructions. When the instructions are executed by the processor, the processor is caused to perform operations. The operations comprise: determining, using a computing system, an amount of air-adjustment to make for one or more of a plurality of air bag jacks provided under the vehicle, based on roll and pitch information of the vehicle, to level the vehicle; and activating, via the computing system, an air compressor to make the determined air-adjustment.

According to further embodiments of the disclosed technology, a leveling system for leveling a vehicle, comprises: a plurality of air bag jacks positioned under the vehicle; an air compressor communicatively coupled to the plurality of air bag jacks; a roll/pitch sensor that determines roll and pitch information of the vehicle; and a computing system. The computing system is configured to: determine an amount of air-adjustment to make for one or more of the plurality of air bag jacks, based on the roll and pitch information of the vehicle, in order to level the vehicle; and activate the air compressor to make the determined air-adjustment.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
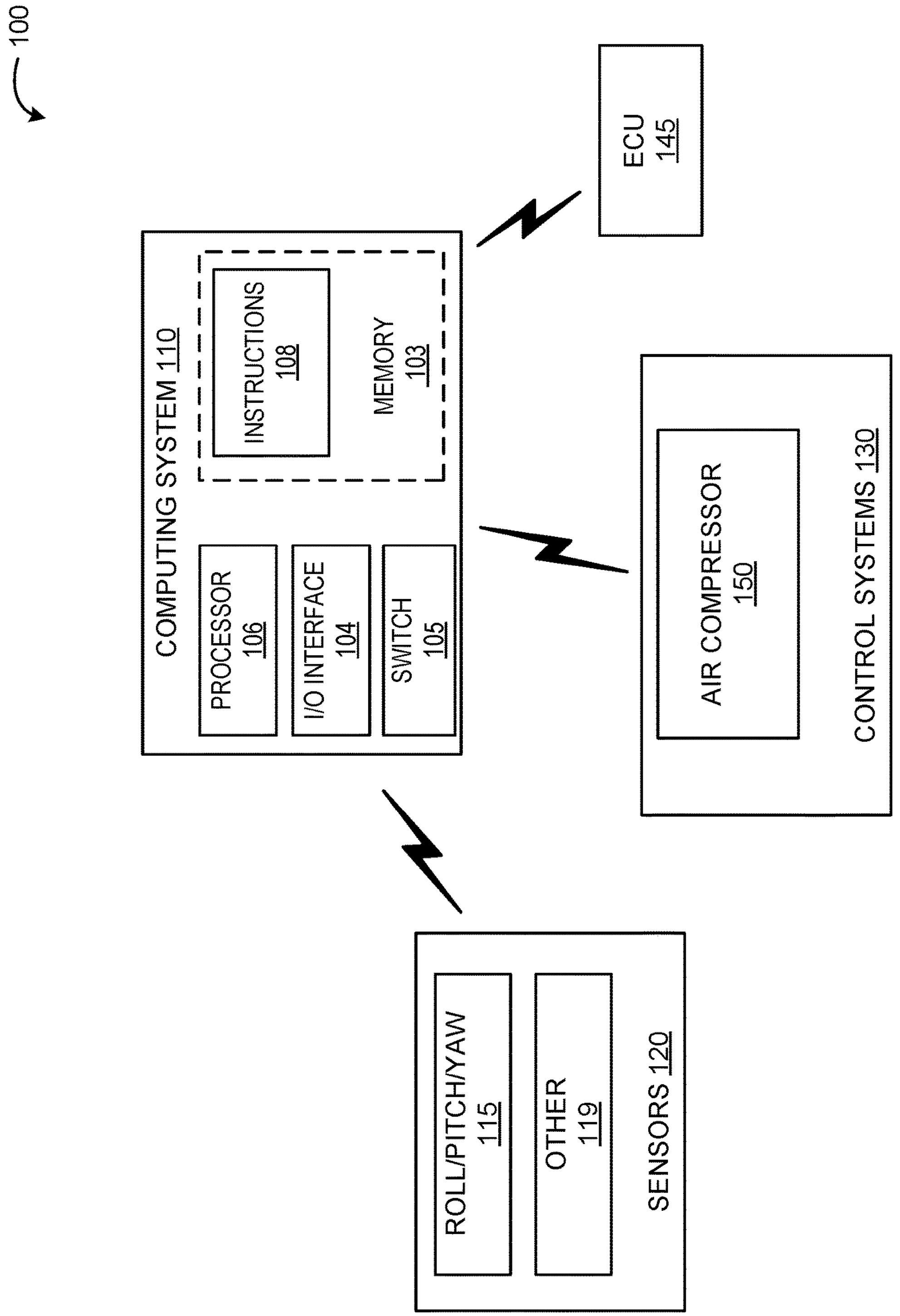
FIG. 1 illustrates an example architecture for a vehicle control system for leveling a vehicle with which embodiments of the disclosed technology may be implemented.

The figures are not exhaustive and do not limit the present disclosure to the precise form disclosed.

DETAILED DESCRIPTION

Embodiments of the systems and methods disclosed herein can provide leveling for a vehicle. In some examples, the systems and methods described in this disclosure can even provide self-leveling of a vehicle using air bag jacks and an air compressor, to simply, efficiently, and quickly achieve a level vehicle with which an occupant of the vehicle can comfortably camp in or sleep in/on, or otherwise spend time in/on or for other purposes.

In an example situation, an occupant of a vehicle may desire to camp in or on the vehicle. Embodiments of the systems and methods disclosed herein may be used with vehicles that use a roof top tent (RTT). RTTs have become increasingly popular as a way for an occupant to safely sleep or simply reside in during camping on or in the vehicle. RTTs are often mounted over/on (or partially over/on) an otherwise open-aired vehicle surface such as a bed portion of a truck that is positioned rearward of the cabin area of the vehicle. RTTs can alternatively be mounted over/on (i.e., wholly or partially over/on) other surfaces of a vehicle, such as a roof, trunk, hood, etc. While using an RTT, an occupant will derive comfort in the fact that he/she will likely be protected from the elements, including low temperatures and other harsh weather conditions such as rain, snow, sleet, hail, wind, etc.

RTT are often designed so that they are quick to set-up and use. However, as mentioned above, previous attempts (using, for example, leveling blocks or even logs or rocks) to level a vehicle (whether performed before, during, of after the set-up of the RTT on the vehicle) can be quite difficult, unreliable, inefficient, and time-consuming. To further exacerbate the situation, these previous attempts offer no indication that serves to confirm the status of the leveling process, or that the vehicle has actually been made level. In fact, with these previous attempts, in determining whether a vehicle is level, an occupant usually relies on visually ascertaining (based on personal observation) whether the vehicle is level. But this visual test is merely subjective, cannot be continuously performed during the leveling process (i.e., while the occupant is currently placing leveling items below portions of the vehicle), and likely not very accurate. Whether using an RTT (per the example situation above) or not, the desire or need to make a vehicle level for any reason, in an easy, reliable, and efficient manner, exists.

Embodiments of the present disclosure improve upon conventional vehicle leveling schemes with a novel vehicle self-level technique that reliably and rapidly levels a vehicle, for example, when the vehicle is used with an RTT or used in another camping scenario. This novel vehicle self-level technique may also provide an indication to the occupant of the vehicle that serves to confirm the status of the leveling process. This enables the occupant to determine whether the vehicle leveling process is proceeding according to plan and may also enable the occupant to determine the remaining time needed for the process to completely level the vehicle. Furthermore, the novel vehicle self-level technique may provide an indication to the occupant when the vehicle has actually been made level. Once the vehicle has reached level status, this indication will serve as a confirmation to the occupant as to the successful completion of the vehicle leveling process.

The systems and methods disclosed herein may be implemented with any of a number of different vehicles and vehicle types. For example, the systems and methods disclosed herein may be used with cars, SUVs, minivans, trucks (e.g., pick-up trucks, flatbed trucks, etc.), buses, construction vehicles, overland vehicles, and other on- and off-road vehicles. These can include vehicles for transportation of people/personnel, materials or other items. In addition, the technology disclosed herein may also extend to other vehicle types as well. An example Vehicle in which embodiments of the disclosed technology may be implemented is illustrated in FIG. 1.

FIG. 1 illustrates an example vehicle with which embodiments of the disclosed technology may be implemented. In this example, vehicle leveling system 100 includes a computing system 110, sensors 120, and control systems 130. Vehicle leveling system 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle leveling system 100 can be partitioned in other ways.

Sensors 120 may include a plurality of different sensors to gather data regarding vehicle leveling system 100, its operation and its surrounding environment. In this example, sensors 120 include 3D accelerometers 115 (e.g., to detect roll/pitch/yaw or, alternatively, to detect just two vehicle orientations such as roll and pitch). Additional other sensors 119 can also be included as may be appropriate for a given implementation of vehicle leveling system 100. For example, other sensors 119 can include environmental sensors (e.g., to detect road/ground conditions such as ground wetness, ice, or other environmental conditions including, for example, atmospheric conditions such as weather). Environmental sensors may even detect factors such as whether the ground is soft, hard, or slippery. Information regarding such environmental factors can be used (in addition to the roll and pitch information) in determining the amount of air-adjustment needed by the air bag jacks in order to make the vehicle level. One or more of the sensors 120 may gather data and send that data to the vehicle electronic control unit (ECU) 145 or other processing unit. Sensors 120 (and other vehicle components) may be duplicated for redundancy.

Accelerometers 115 may include a 3D accelerometer to measure roll, pitch and yaw of the vehicle (or to measure just two vehicle orientations such as roll and pitch, if desired). Accelerometers 115 may include, either alone or in combination, any number of accelerometers, gyroscopes, or other position/orientation sensing devices such as MEMS devices. Accelerometers 115 may be implemented generally for the vehicle or in any of a number of systems or subsystems within the vehicle to sense position and orientation of the vehicle in terms of roll, pitch, and yaw, and changes to the position and orientation of the vehicle based on inertia (again, in terms of roll, pitch, and yaw).

As mentioned above, other sensors 119 may be provided as well. Various sensors 120 may be used to provide input to computing system 110 and other systems of the vehicle leveling system 100 so that the systems have information useful to operate in self-leveling mode.

Control systems 130 may include a plurality of different systems/subsystems to control operation of vehicle leveling system 100. In this example, control systems 130 include an air compressor 150.

Figure 2:
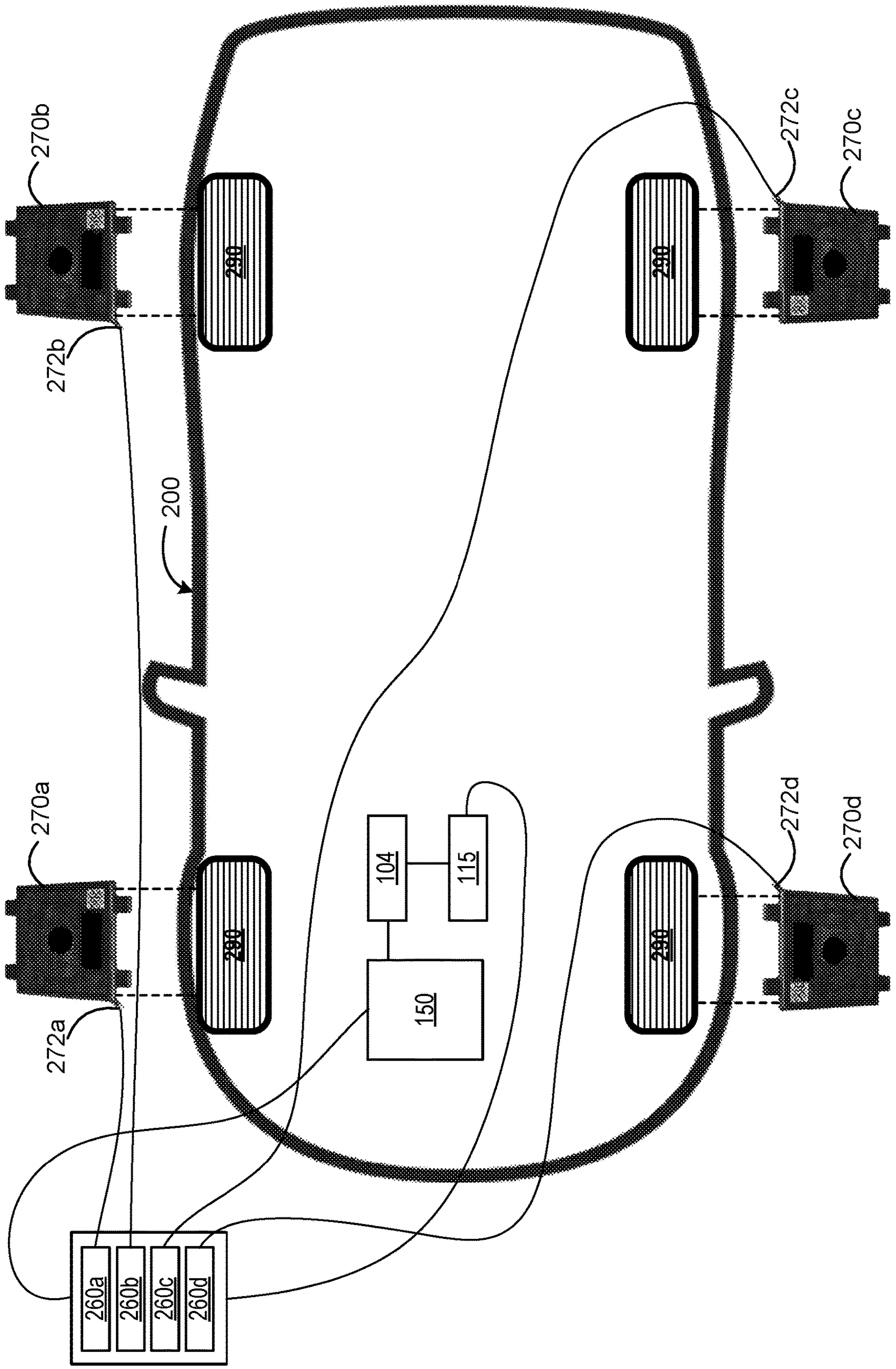
FIG. 2 illustrates a partially exploded schematical view of an example vehicle with which embodiments of the technology disclosed herein may be implemented.

Air compressor 150 can be included to supply air to each of the air bag jacks 270*a*-270*d* (see FIG. 2). It is noted that other types of air supplying devices (e.g., pumps, air blowers, etc.) may alternatively be employed in place of the air compressor 150. Each of the air bag jacks 270*a*-270*d* can be inflated independently using pneumatic solenoid valves 260*a*-260*d*, respectively. The pneumatic solenoid valves 260*a*-260*d* are connected via flexible tubing/piping/conduits between the air compressor 150 and input valves 272*a*-272*d* of the air bag jacks 270*a*-270*d*, respectively. The pneumatic solenoid valves 260*a*-260*d* are normally closed, so when the air compressor 150 is not in use, the air bag jacks 270*a*-270*d* will remain at the same height and hold its location.

Figure 3:
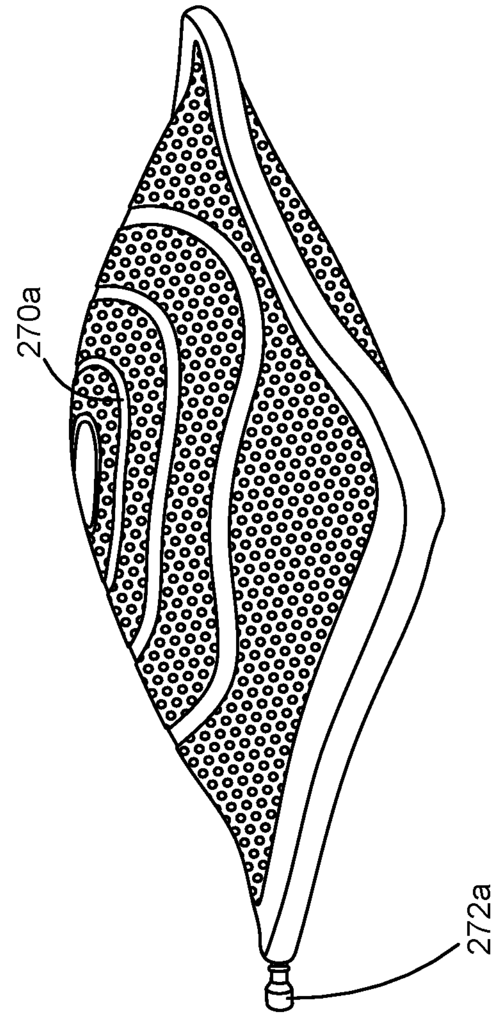
FIG. 3 illustrates an elevated perspective view of an example air bag jack, in accordance with embodiments disclosed herein.

FIG. 3 illustrates an elevated perspective view of one of the air bag jacks 270*a* including a corresponding input valve 272*a*. In an example, the air bag jacks 270*a*-270*d* can vary in height from approximately 1 inch to approximately 8 inches. Other types of inflatable air jacks may be contemplated in place of the air bag jacks 270*a*-270*d* for the vehicle leveling system 100. For example, air jacks that have multiple annular sections exteriorly resembling stacked donuts (with the same or varying diameters) may alternatively be used. These air jacks having multiple annular sections can also be referred to as air bag jacks.

Figure 4B:
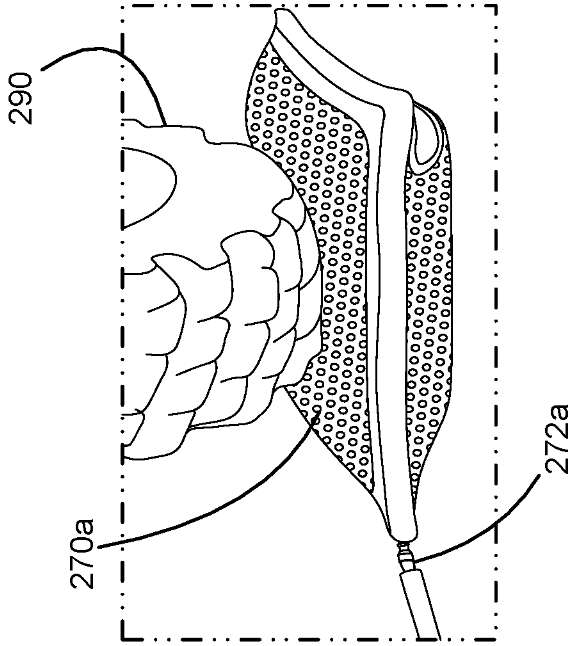
FIG. 4B illustrates an elevated side view of the air bag jack shown in FIG. 3 in operation under a tire of a vehicle.
Figure 4A:
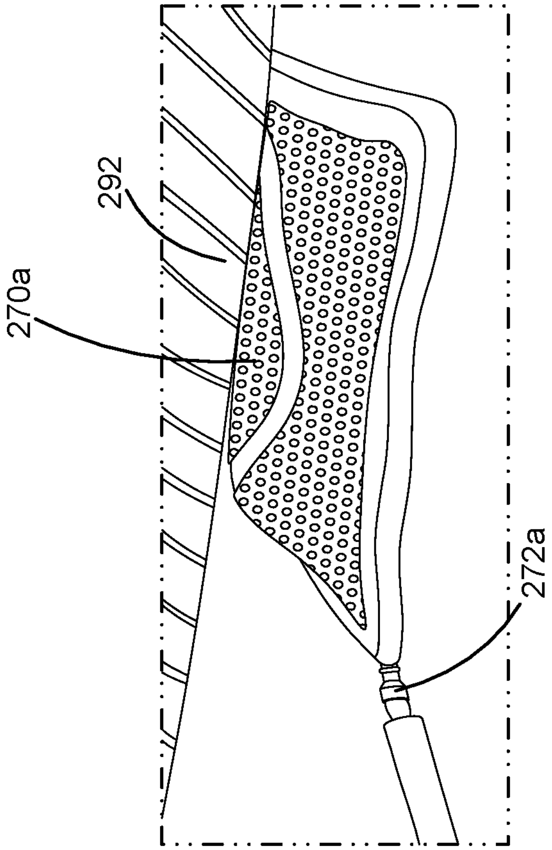
FIG. 4A illustrates an elevated side view of the air bag jack shown in FIG. 3 in operation under a frame portion of a vehicle.

In operation, the air bag jacks 270*a*-270*d* can be placed under and in contact with various portions of the vehicle to make adjustments to the vehicle's roll and pitch, in order to achieve and maintain proper vehicle leveling, in accordance with embodiments disclosed herein. For example, FIG. 4A illustrates an elevated side view of the air bag jack 270*a* shown in FIG. 3 in operation under a frame or body portion 292 of a vehicle. Alternatively, FIG. 4B illustrates an elevated side view of the air bag jack 270*a* shown in FIG. 3 in operation under a tire 290 of a vehicle.

Computing system 110 in the illustrated example shown in FIG. 1 includes a processor 106, and memory 103. Some or all of the functions of vehicle leveling system 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle leveling system 100, including those of control systems 130, ECU 145, vehicle systems, and subsystems. Memory 103 may contain additional instructions as well, including instructions to transmit data to, receive data from, interact with, and/or control one or more of the sensors 120, control systems 130 and ECU 145. In addition to the instructions, memory 103 may store data (such as, for example, data relating to the vehicle's pitch and roll as sensed by accelerometers 115) and other information used by the vehicle leveling system 100 and its control systems 130, ECU 145, vehicle systems, and subsystems for operation, in accordance with any of the vehicle leveling techniques described below.

Although one computing system 110 is illustrated in FIG. 1, in various embodiments multiple computing systems 110 can be included. Additionally, one or more systems and subsystems of vehicle leveling system 100 can include its own dedicated or shared computing system 110, or a variant thereof. Accordingly, although computing system 110 is illustrated as a discrete computing system, this is for ease of illustration only, and computing system 110 can be distributed among various vehicle systems or components. In some examples, computing functions for various embodiments disclosed herein may be performed entirely on computing system 110, distributed among two or more computing systems 110 of vehicle leveling system 100 or the vehicle in general, performed on a cloud-based platform, or performed on a combination of the foregoing.

Vehicle leveling system 100 may also include a wireless communication system (not illustrated) to communicate with sensors 120, control systems 130, ECU 145, other cloud components and other external entities using any of a number of communication protocols including, for example, V2V, V2I and V2X protocols. Such a wireless communication system may allow vehicle leveling system 100 to receive data regarding roll and pitch information from accelerators 115, data regarding weather conditions, and so on.

The example of FIG. 1 is provided for illustration purposes only as one example of a vehicle leveling system with which embodiments of the disclosed technology may be implemented. One of ordinary skill in the art reading this description will understand how the disclosed embodiments can be implemented with this and other vehicle platforms.

To initiate the process of vehicle leveling, an occupant of the vehicle can press a start mechanism provided via a physical controller (e.g., a physical switch, toggle, or button) within the vehicle, or via a representation of a text command or controller (e.g., an animated image of a switch, toggle, or button) on a graphical user interface of a multimedia display (e.g., via I/O interface 104 within computing system 110, as illustrated in FIG. 1) within the vehicle. Pressing the start mechanism will send a signal to the accelerometers 115 to ascertain the orientation and position of the vehicle. A signal can then be sent to the computing system 110 which determines which air bag jacks need to be adjusted (via inflation or deflation) or stay the same, and the amounts of adjustment necessary in order to make the vehicle level. The air compressor 150 would then be activated and the appropriate pneumatic solenoid valves 260*a*-260*d* would be activated or deactivated based on how much inflation is needed in order to make the vehicle level. Feedback from the accelerometers 115 can indicate the status of the vehicle leveling (prior to reaching level condition) or confirm that the vehicle has reached level condition. Prior to reaching level condition, the feedback can also be used via computing system 110 to make further adjustments (i.e., self-leveling) to attain the level condition in an automated manner.

Figure 5:
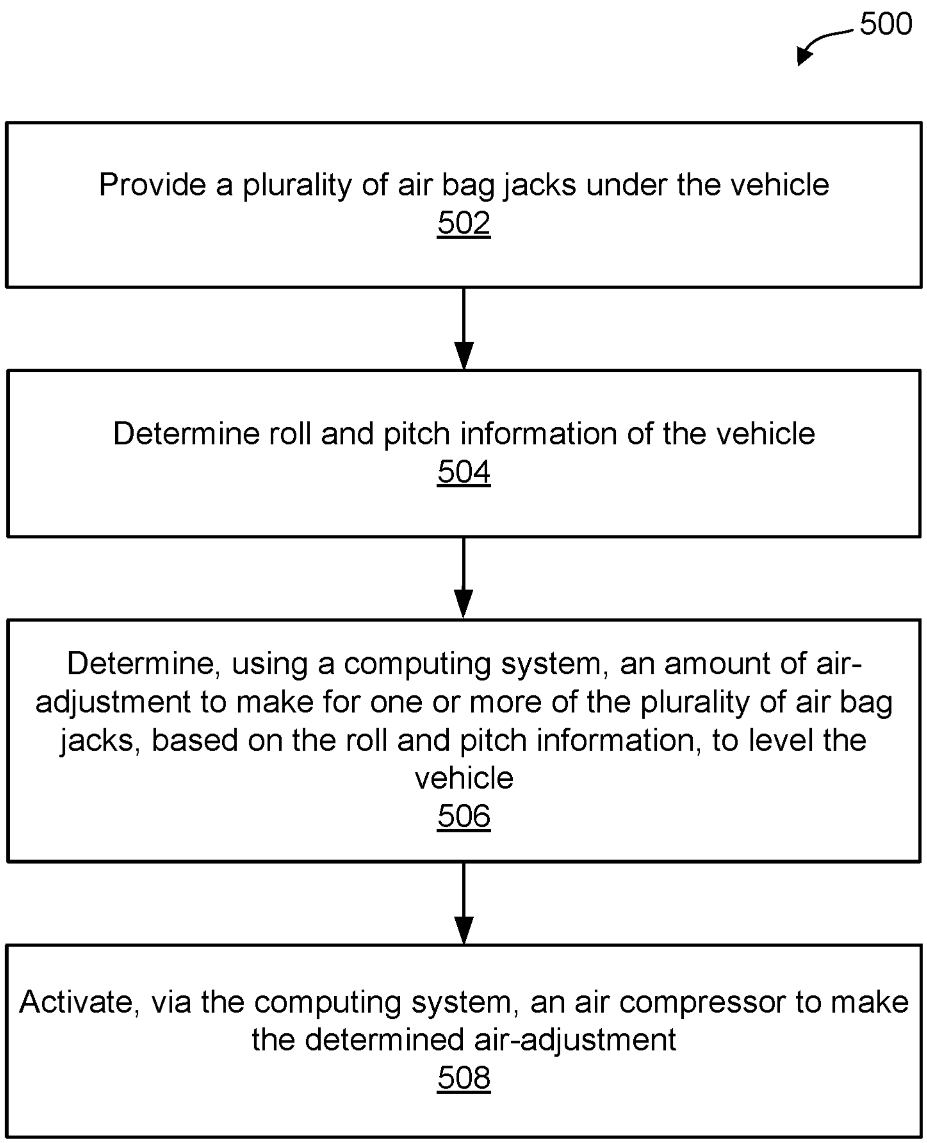
FIG. 5 is a flowchart illustrating example operations for leveling a vehicle, in accordance with embodiments disclosed herein.

FIG. 5 is a flowchart illustrating example operations that can be performed for leveling a vehicle, in accordance with some embodiments disclosed herein. Inherent in this example process is the ability to provide self-leveling of a vehicle using air bag jacks, an air compressor, pneumatic solenoid valves, and feedback from accelerometers. Example method 500 may be performed by the corresponding systems and subsystems of the vehicle leveling system illustrated in FIGS. 1-2.

At operation 502, a plurality of air bag jacks is provided under a vehicle. As little as two air bag jacks are needed and can be placed under and in contact with various portions of the vehicle so as to make adjustments to the vehicle's roll and pitch, in order to achieve and maintain proper vehicle leveling, in accordance with embodiments disclosed herein.

At operation 504, roll and pitch information of the vehicle is determined. The roll and pitch information is obtained by accelerometer(s) that detect roll/pitch/yaw of the vehicle or, alternatively, detect just two vehicle orientations/positions such as roll and pitch. The accelerometer(s) can be located anywhere in or on the vehicle.

A signal including the roll and pitch information may be transmitted to a computing system. The computing system may receive the signal sent by the accelerometer(s) wirelessly (via a wireless transceiver circuit) and/or using a wired connection (via a wired I/O interface such as I/O interface 104 with an associated hardwired data port). The wireless transceiver circuit can include a transmitter and a receiver to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. An antenna may be coupled to the wireless transceiver circuit and used by the wireless transceiver circuit to receive the signal from the accelerometer(s) and to transmit information back to the accelerometer(s) as well, if necessary, e.g., for feedback purposes. These signals can include information of almost any sort that is sent or received by the computing system 110 to/from other entities such as sensors 120, control systems 130, and ECU 145.

At operation 506, the computing system determines an amount of air-adjustment to make for one or more of the plurality of air bag jacks, to level the vehicle. The computer may make these determinations based on the roll and pitch information from the signal received by the computing system.

At operation 508, the computing system activates an air compressor to make the determined air-adjustment. The air compressor may receive the activation instructions sent by the computing system wirelessly (via the wireless transceiver circuit mentioned above) or using a wired connection (via the wired I/O interface such as the I/O interface 104 with the associated hardwired data port, as mentioned above).

In some examples, the method 500 may further include determining a selected air bag jack of the plurality of air bag jacks to adjust and opening a pneumatic solenoid valve corresponding to the selected air bag jack to permit air-adjustment. In one example, as mentioned above, the method 500 may further include closing the opened pneumatic solenoid valve after air-adjustment is made to the selected air bag jack. Because the pneumatic solenoid valves are normally closed, when the air compressor is not in use (e.g., after the vehicle reaches level condition), the air bag jacks will remain at the same height and hold its location. The normally closed nature of the pneumatic solenoid valves may also be beneficial if the vehicle leveling process is paused for any reason.

In some examples, the determination of the roll and pitch information of the vehicle is made using a roll/pitch sensor. As mentioned above, the roll/pitch sensor may include, either alone or in combination, any number of accelerometers, gyroscopes, or other position/orientation sensing devices such as MEMS devices.

In some examples, roll and pitch information of the vehicle can be determined subsequent to making the determined air-adjustment to identify a level condition of the vehicle. In one example, the identified level condition of the vehicle serves to confirm that the vehicle is level. This confirmation that the vehicle is level can be provided to the occupant via, for example, an indication on a graphical user interface of the multimedia display within the vehicle. In another example, the identified level condition of the vehicle serves to identify that a non-level condition of the vehicle exists indicating that a further air-adjustment needs to be made to level the vehicle. This identification that a non-level condition of the vehicle exists can also be provided to the occupant via, for example, an indication on the graphical user interface of the multimedia display within the vehicle. Upon the identification that a non-level condition of the vehicle exists, the above steps (e.g., determining using the computing system, activating, and determining roll and pitch information of the vehicle subsequent to making the determined air adjustment) may be repeated until the vehicle is level. The process of repeating can be automatically initiated by the computing system 110 or can be initiated via the occupant via a continue/resume-leveling mechanism similar in form to the start mechanism (mentioned above or below) used to initiate the leveling process (i.e., at the start of the vehicle leveling process).

In some examples, the vehicle leveling process is initiated by pressing a start mechanism. The start mechanism may be provided via a physical controller (e.g., a physical switch, toggle, or button) within the vehicle, or via a representation of a text command or controller (e.g., an animated image of a switch, toggle, or button) on a graphical user interface of a multimedia display within the vehicle.

Figure 6:
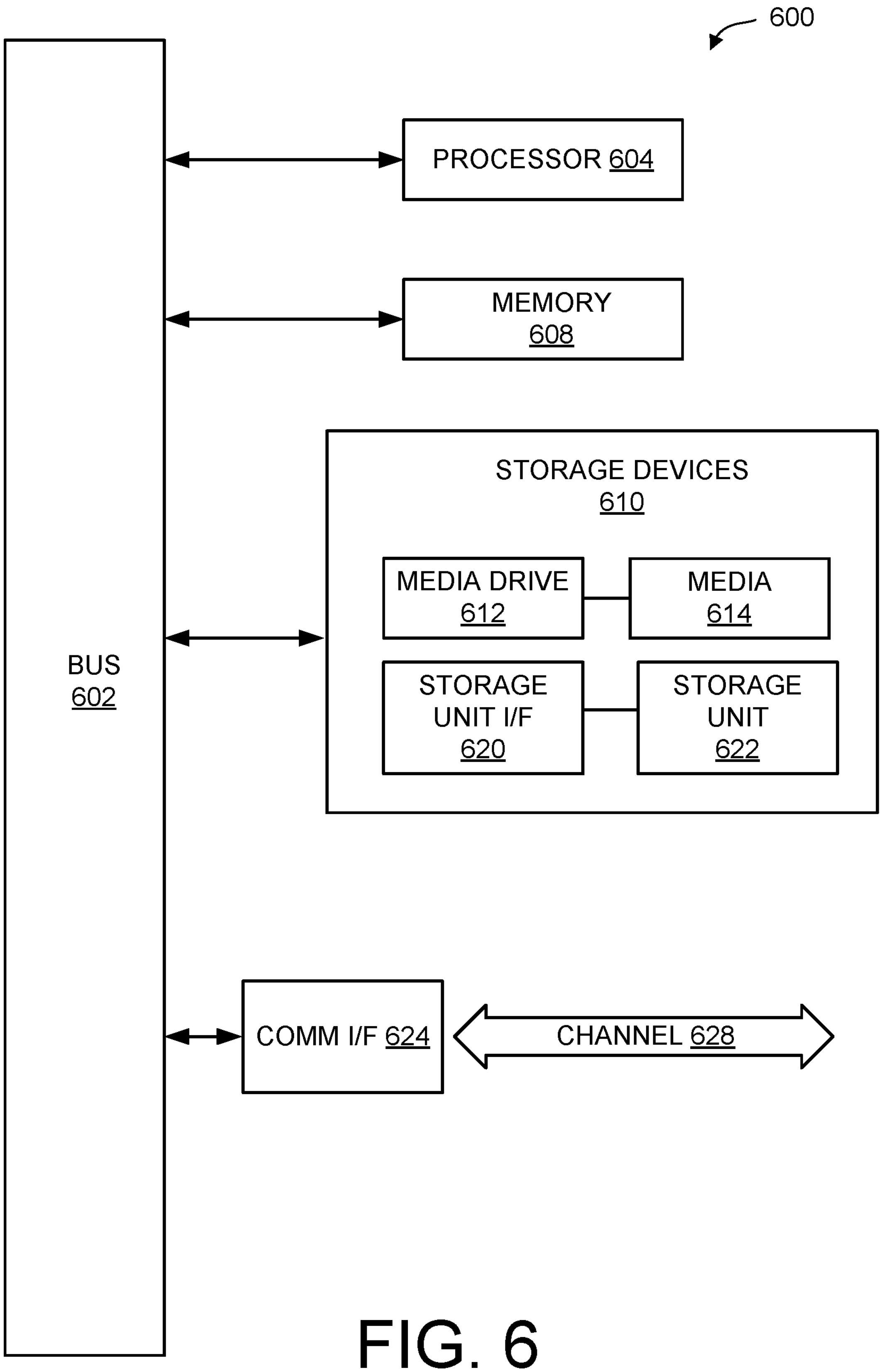
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionalities can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices, such as a processor 604. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanisms/devices 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanisms/devices 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 622, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of leveling a vehicle, comprising:

providing a plurality of inflatable air bag jacks between a vehicle wheel and ground beneath the vehicle wheel;

determining roll and pitch information of the vehicle using a roll/pitch sensor located in or on the vehicle;

determining, using a computing system, an amount of air-pressure adjustment to make for one or more of the plurality of inflatable air bag jacks, based on the roll and pitch information, to level the vehicle;

activating, via the computing system, an air compressor configured to provide variable air-pressure levels to make the determined air-pressure adjustment; and using feedback from the roll/pitch sensor to adjust the air pressure in each inflatable air bag jack until the vehicle achieves a level condition.

2. The method of claim 1, further comprising determining a selected inflatable air bag jack of the plurality of inflatable air bag jacks to adjust and opening a pneumatic solenoid valve corresponding to the selected inflatable air bag jack to permit air-pressure adjustment.

3. The method of claim 2, further comprising closing the opened pneumatic solenoid valve after air-pressure adjustment is made to the selected inflatable air bag jack.

4. The method of claim 1, further comprising determining roll and pitch information of the vehicle subsequent to making the determined air-pressure adjustment to identify a level condition of the vehicle.

5. The method of claim 4, wherein the identified level condition of the vehicle serves to confirm that the vehicle is level.

6. The method of claim 4, wherein the identified level condition of the vehicle serves to identify that a non-level condition of the vehicle exists indicating that a further air-pressure adjustment needs to be made to level the vehicle.

7. The method of claim 6, wherein upon the identification that a non-level condition of the vehicle exists, the method further comprises repeating, using the steps of determining using the computing system, activating, and determining roll and pitch information of the vehicle subsequent to making the determined air-pressure adjustment, until the vehicle achieves the level condition.

8. The method of claim 1, further comprising pressing a start mechanism to initiate the method.

9. The method of claim 8, wherein the start mechanism is provided via a physical controller within the vehicle.

10. The method of claim 8, wherein the start mechanism is provided via a representation of a text command or controller on a graphical user interface of a multimedia display within the vehicle.

11. The method of claim 1, wherein the air compressor is located in the vehicle.

12. The method of claim 1, wherein each of the plurality of inflatable air bag jacks are in direct physical contact with one of the vehicle wheel, frame of the vehicle, and a body of the vehicle.

13. A vehicle control system for leveling a vehicle, comprising:

one or more processors; and memory coupled to at least one of the one or more processors to store instructions, which when executed by the at least one of the one or more processors, cause the at least one of the one or more processors to perform operations, the operations comprising:

determining, using a computing system, an amount of air-pressure adjustment to make for one or more of a plurality of inflatable air bag jacks provided between a vehicle wheel and a surface beneath the vehicle wheel, based on roll and pitch information of the vehicle obtained using a roll/pitch sensor located in or on the vehicle, to level the vehicle;

activating, via the computing system, an air compressor configured to provide variable air pressure levels to make the determined air-pressure adjustment;

using feedback from the roll/pitch sensor to adjust the air pressure in each inflatable air bag jack until the vehicle achieves a level condition.

14. The vehicle control system of claim 13, wherein the air compressor is located in the vehicle.

15. The vehicle control system of claim 13, wherein each of the plurality of inflatable air bag jacks are in direct physical contact with one of the vehicle wheel, frame of the vehicle, and a body of the vehicle.

16. The vehicle control system of claim 13, wherein the operations further comprise:

initiating the operation responsive to a start mechanism being pressed, wherein the start mechanism is provided via a physical controller within the vehicle, or via a representation of a text command or controller on a graphical user interface of a multimedia display within the vehicle.

17. A leveling system for leveling a vehicle, comprising:

a plurality of inflatable air bag jacks positioned between a vehicle wheel and a surface beneath the vehicle wheel;

an air compressor communicatively coupled to the plurality of inflatable air bag jacks;

a roll/pitch sensor, located in or on the vehicle, that determines roll and pitch information of the vehicle; and a computing system configured to:

determine an amount of air-pressure adjustment to make for one or more of the plurality of inflatable air bag jacks, based on the roll and pitch information of the vehicle, in order to level the vehicle;

activate the air compressor to make the determined air-pressure adjustment; and use feedback from the roll/pitch sensor to adjust the air pressure in each inflatable air bag jack until the vehicle achieves a level condition.

18. The leveling system of claim 17, wherein the air compressor is located in the vehicle.

19. The leveling system of claim 17, wherein each of the plurality of inflatable air bag jacks are in direct physical contact with one of the vehicle wheel, frame of the vehicle, and a body of the vehicle.

20. The leveling system of claim 17, further comprising:

a start mechanism to initiate leveling the vehicle, wherein the start mechanism is provided via a physical controller within the vehicle, or via a representation of a text command or controller on a graphical user interface of a multimedia display within the vehicle.

* * * * *